United States Patent

McCartney et al.

[11] Patent Number: 6,051,028
[45] Date of Patent: Apr. 18, 2000

[54] DIGITISER

[75] Inventors: James McCartney, Glengormley; Anthony Mark Garley, Rutland; David William Whittingham, Leicester, all of United Kingdom

[73] Assignee: Texon U.K. Ltd., United Kingdom

[21] Appl. No.: 08/879,016

[22] Filed: Jun. 19, 1997

[30] Foreign Application Priority Data

Jun. 21, 1996 [GB] United Kingdom .................... 9613045
Aug. 27, 1996 [GB] United Kingdom .................... 9617818

[51] Int. Cl.$^7$ .............................. G06F 9/455; G05B 19/42
[52] U.S. Cl. ........................................................ 703/7; 703/2
[58] Field of Search ............................... 364/512; 395/500

[56] References Cited

U.S. PATENT DOCUMENTS 4,737,032  4/1988  Addleman et al. ...................... 356/376
4,760,851  8/1988  Fraser et al. ............................ 600/587
4,997,369  3/1991  Shafir ........................................ 433/72
5,345,490  9/1994  Finnigan et al. ............................ 378/4
5,687,467  11/1997  Bergmann et al. .................. 29/407.05

FOREIGN PATENT DOCUMENTS

05772123 A2  12/1993  European Pat. Off. ........ G05B 19/42

*Primary Examiner*—Kevin J. Teska
*Assistant Examiner*—Samuel Broda

[57] ABSTRACT

A method of digitizing a three dimensional object 10. The method using a point digitizer which defines the envelope dimensions 11, 12, 13, 14, 15 and 16 of the object 10 and uses a cloud data capture technique to acquire data points as a pen-element of the digitizer is scrubbed or randomly moved across the object 10 surface. The data points being processed by the digitizer to produce a plurality of object contours between opposed edges of the envelope dimension 13, 14, 15, 16 at spaced points Sj, Ej respectively. These object contors defining the object 10 shape for digital mapping within a computer aided design (CAD) system.

9 Claims, 3 Drawing Sheets

- 1st.
× 2nd.

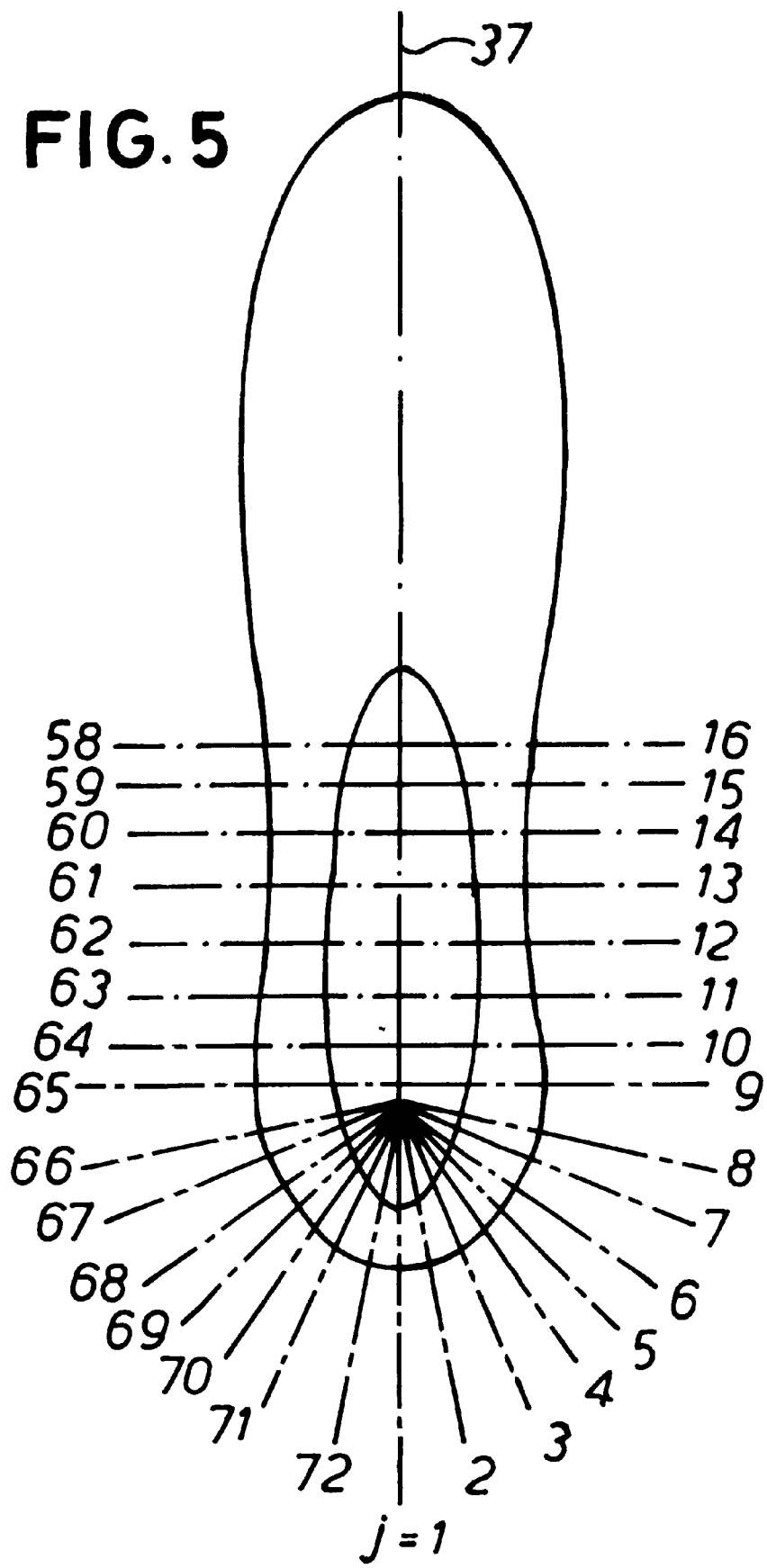

DIGITISER

FIELD OF THE INVENTION

The present invention relates to a digitiser for three-dimensional objects and more particularly, but not exclusively, to a digitiser for a shoe last.

BACKGROUND OF THE INVENTION

It will be understood that shoes are designed both in two dimensions and in three dimensions. The traditional approach was obviously using a pen and pencil, however, more recently, use of computer-aided design (CAD) packages have become the more common tool used by a shoe designer. This movement from paper to computer-based systems has occurred in a wide range of industries. Typically, there is a supplier of the basic CAD system and a multitude of companies who adapt these basic systems to the specific requirements of a particular industry. One computer-based design system available in the shoe industry is the CRISPIN system supplied by British United Shoe Machinery Limited of Leicester, England.

A typical CAD system for shoe design would include facilities for design in two dimensions, i.e. flat leather pieces and in three dimensions to see the practical effect as a perspective view of the designed shoe. The CAD system includes software to allow transformation between two dimensions and three dimensions along with facilities to simulate surface texture, decoration, colour and edge type.

An obvious requirement for the three-dimensional representation of a shoe design is a digitised map of a shoe last upon which the three-dimensional design can be superimposed. Shoe lasts traditionally have been made of wood but, more recently, lasts made of plastics materials have become common, and occasionally other materials such as steel or aluminium are used.

There are two approaches with regard to utilisation of a shoe last; the first is to design a bespoke shoe last for a particular shoe design or the alternative is to use an existing set of shoe lasts and design around them. Obviously, the first approach is more expensive and requires, after use, for the shoe lasts to either be stored in an archive or disposed of. In any event, typically, the acquisition of a CAD system will be by an existing shoe manufacturer who will wish to utilise his existing shoe lasts.

In the past, digitising a shoe last to provide a digital map of that last usable by a CAD system has been achieved by two approaches. Firstly, a laser triangulation technique has been used based upon projection of at least one laser point upon a rotating shoe last and observing the reflected pattern to determine position and/or shape. This laser triangulation technique is described in European Patent Application No. 90311179.7 (British United Shoe Machinery Limited et al). The alternative, is to use a so-called point digitiser, including a pen-like device, designed to move over the surface of the three-dimensional body in order to determine the three-dimensional body shape by variation in position of the pen-like device polled by a processor unit. In the case of shoe lasts, this roving of the point digitiser pen element over the last requires drawing a net of lines upon the last in order that all the areas of the last can be digitised by tracing with the pen these drawn lines and intersections on the last. An example of a 3-D point digitiser is MicroScribe-3D supplied by Immersion Corp. of San Jose, Calif., U.S.A.

It will be understood that drawing regularly spaced lines upon a shoe last and, then diligently following these lines with a point digitiser pen, is both cumbersome and inconvenient. Furthermore, due to the necessary manipulation of the point digitiser accurately, following the lines drawn on the shoe last may be difficult.

It is an objective of the present invention to provide a method of using a point digitiser to digitise a three-dimensional object, such as a shoe last, whilst avoiding the problems of prior line definition before digitisation.

BRIEF SUMMARY OF THE INVENTION

In accordance with a first embodiment of the present invention there is provided a method of digitising a three-dimensional object, such as a shoe last using a point digitiser, the method including the steps of:

a) presenting the object to the point digitiser such that at least a first part of its respective envelope dimensions in the X, Y, Z-axes planes are determined;

b) scrubbing the point digitiser across the surface of the object such that random special data points are collected as a cloud data set;

c) at spaced positions about the envelope dimensions determining best fit line projections from the selected data points in the cloud data to create for each spaced position an object contour which defines the shape of that object in the projected plane of each respective spaced position; and d) consolidating each part digitized through steps (a), (b) and (c) above and, in particular, the object contours in order to create a digitised map of the object which represents the three-dimensional shape of that object.

Preferably the object is digitized in two halves and these halves are keyed together for consolidation by common reference points on each half. For a shoe last, these preference points may be the toe tip, the heel back and core front.

Preferably, the object is a shoe last and the envelope dimensions are defined as the forepart symmetry line, seat symmetry-line, left side featherline, left side topline, right side featherline and right side topline.

In accordance with an alternative embodiment of the present invention there is provided digitiser apparatus for three-dimensional object such as a shoe last, the apparatus including a point digitiser arranged to include a contact element whose special position is polled periodically either at specific time or distance intervals, and processor means arranged to receive the respective envelope dimensions of an object to be digitised and a cloud data set of random special data points about the surface of the object, said processor means being configured to define from said envelope dimensions by selection of data points from the cloud data set a plurality of respectively spaced object contours and consolidation of said object contours to determine a digital map of the object three-dimensional shape. This apparatus being arranged to operate in accordance with the method above defined.

BRIEF DESCRIPTION OF THE DRAWINGS

An embodiment of the present invention will now be described by way of example only with reference to the accompanying drawings in which:

FIG. 5 is a schematic plan illustration of object contours in accordance with the present invention.

DESCRIPTION OF THE INVENTION

Figure 1:
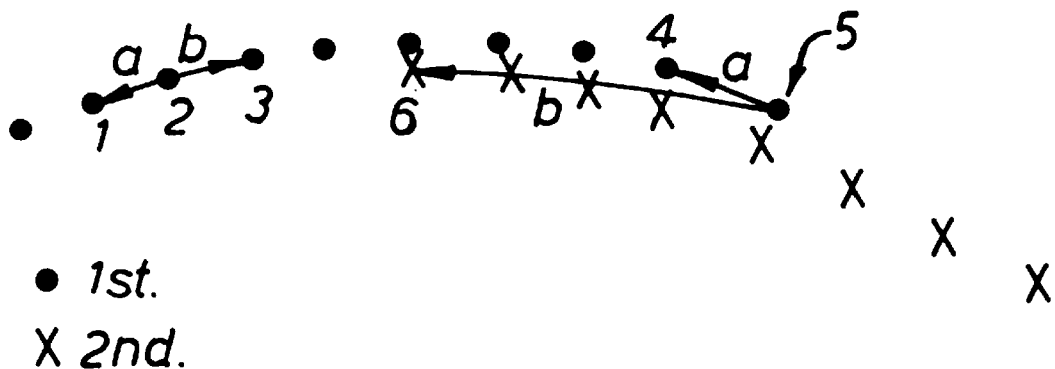
FIG. 1 is a schematic illustration showing projection of digitised points in accordance with the present invention.
Figure 2:
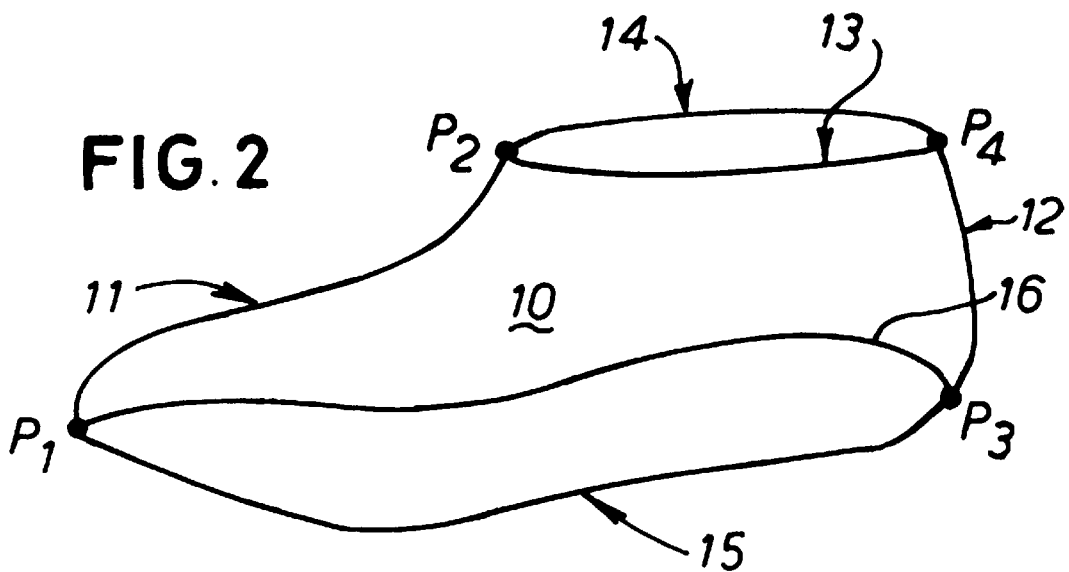
FIG. 2 is a schematic representation illustrating the acquisition of envelope dimensions of an object.

Referring to FIG. 1 defining the basic method of digitisation. The precise method of digitisation can be discrete point digitisation or stream-feed digitisation. The difference is that point digitisation requires explicit press and release of a control button to record or poll a special position as a data point whereas stream digitisation captures a stream of data points while the control button is depressed, i.e. the digitiser is arranged to poll digitiser position after specific time periods or after specific movement of the sensor. Typically, the sensor of a point digitiser will be in a pen format to allow ease of manipulation. Movements of this pen element will be detected using axial and/or special sensors to determine movement and rotation of the pen. Thus, it will be appreciated that the pen element must initially be calibrated in the digitiser reference frame. With regard to stream-feed digitisation, it will be appreciated that tolerance and accuracy of the digitiser can be determined by choice of the sampling parameter, i.e. the number of data points acquired per second or unit area.

Digitisation allows local editing of a digitised line by subsequently detecting when a line has backtracked and deletion of previously digitised points in the common area. Backtracking detection is performed by processing every grouping of three consecutive points in a line sequence. Two vectors a. and b. are determined between data points. Where the scalar product of vectors a. and b. is positive then backtracking is assumed to have occurred.

In FIG. 1 the spots represent a first set of digitised points and the crosses a second set of digitised points. It will be seen with a first data set comprising points 1, 2, 3 all taken from the first data set that movement 1 to 2 to 3 is positive and thus there is no backtracking condition. However, in an alternative data set defined as 4, 5, 6 that movement 5 to 4 and 5 to 6 are both positive and thus create a scalar product of the vectors a. and b. which is positive between the first and second data sets and confirms backtracking between the first set of digitised points (spots) and the second set of digitised points (x). Thus, redundancy in the necessary number of data points to be analysed in subsequent processing steps can be determined by this backtracking detection means to reduce processing time by abandonment, either completely or for temporary hold purposes, of certain data points acquired.

In accordance with the present invention, the initial stage of digitisation of a three-dimensional object 10 is to acquire the major envelope dimension of that object 10. In the illustrated embodiment, the object 10 is a shoe last. The first stage of digitising this shoe last is to define the six contours which define the dimensional envelope of the object 10. These are the forepart symmetry line 11, the seat symmetry line 12, the left topline 13, the right topline 14, the left featherline 15 and the right featherline 16. This dimensional envelope defines the operational area or more correctly volume, for subsequent data acquisition.

Figure 3:
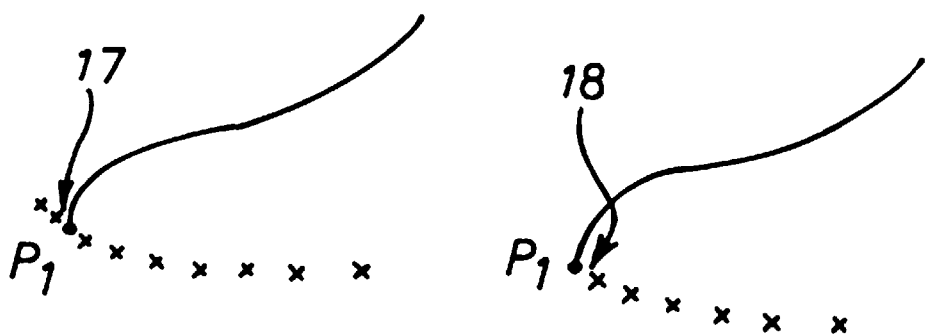
FIG. 3 is a schematic representation illustrating truncation of acquired data points for refinement of envelope dimension acquisition.

Firstly, the forepart symmetry line 11 and seat symmetry line 12 are assumed to take precedence over the other four lines 13, 14, 15 and 16 of the dimensional envelope which defines the object 10. Thus, junction points $P_1$, $P_2$, $P_3$ and $P_4$ define the junction points where the envelope lines 11 through to 16 are joined to define the object envelope dimensions. To acquire the data which define the lines 11 through to 16, the pen element of the point digitiser is drawn along the edges of the object 10 which define these lines. As indicated above the forepart symmetry line 11 and seat symmetry line 12 are given precedence at the junctions $P_1$, $P_2$, $P_3$ and $P_4$. Thus, as seen in FIG. 3, overshoot of data points illustrated as points 17 in FIG. 3 is ignored to create a neat junction $P_1$ with end data points 18. A similar truncation exercise is conducted at all points $P_1$, $P_2$, $P_3$ and $P_4$ for the junction of the envelope lines 11 through to 16. The featherlines 15,16 and the toplines 13,14 are truncated so that they still end at the three-way junction points $P_1$, $P_2$, $P_3$, and $P_4$ in a consistent manner. This may require them to be extended or trimmed as illustrated in FIG. 3. It is of paramount importance that the envelope defined by the lines 11 through to 16 provides a consistent framework envelope within which the three-dimensional shape configuration of the object 10 can be defined.

It will be understood that the object envelope dimensions may be independently retained by the point digitiser processor unit as a standard and so avoid this object envelope dimensions acquisition stage. Thus, a library of standard object envelope dimensions may be held by the processor unit for building block objects. These envelopes could be combined to create composite object structures or used as a basic structure upon which surface features could be added. For example, in orthopaedic shoes a basic shoe last could be used upon which surface structures are added to equate to or accommodate patient foot irregularities.

Figure 4:
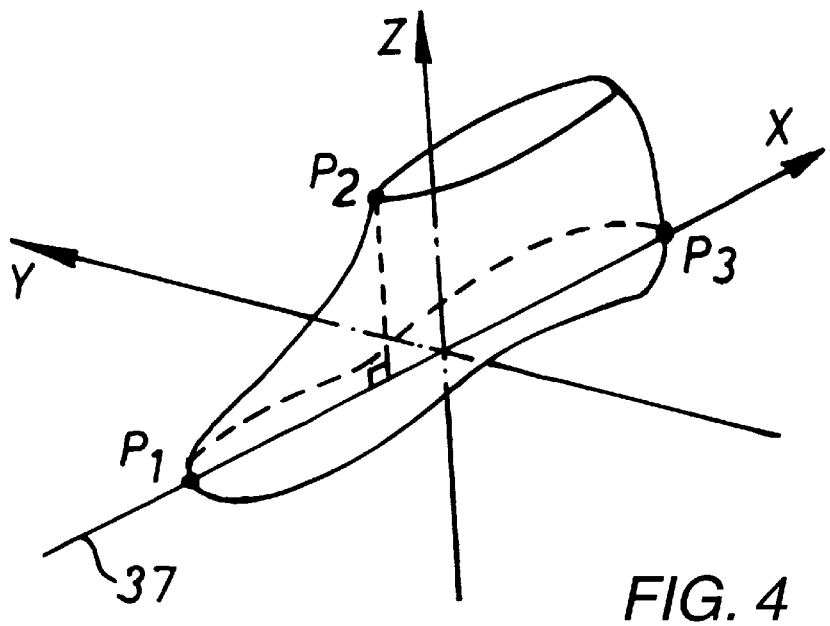
FIG. 4 is a schematic illustration illustrating the axial relationship of an object in accordance with the present invention.

In order to achieve accurate and consistent digitisation, it is essential that the object 10 is held consistently within a known reference framework. Thus, typically a shoe last for example will be held on a mounting spigot presented through an appropriate surface such that the available area for interrogation by the pen element of the point digitiser is only marginally diminished. However, the initial dimensional envelope line digitisation described above can proceed with any orientation of the object 10, as it is the outline shape of the object 10 that is being defined. Thus, the object 10 could be held in a user's hand if this was more convenient. Once the dimensional object envelope is stored by a processor unit of the point digitiser, it can be transformed to align the dimensional envelope with a predetermined configuration which may be consistent with the object 10 mounting. This predetermined configuration maps or transforms the points $P_1$ and $P_3$ so that they lie on the X-axis with a toe point $P_1$ always assuming the X position. The final rotational degree of freedom is determined by fixing a point, i.e. top forepart point $P_2$ to lie in the X–Z plane or have a definition Y=0 (FIG. 4). Thus, the axial or spacial relationship of the mounted object 10 is consistent with the point digitiser spacial relationship defined for the pen element of the point digitiser.

It will be understood, by the transform sequence illustrated with regard to FIG. 4 that, presentation of a standard configuration to the user is available. This is particularly useful as will be understood by the following description wherein the random positional acquisition data utilised can be more readily appreciated when viewed in a standard configuration by the user.

Essentially the present invention uses a cloud digitisation system to fill in the shape contour between the lines which define the dimensional envelope of the object 10.

The toplines 13,14 and the featherlines 15,16 are considered by the processor unit of the point digitiser to facilitate determination of 72 contour planes between these lines of the object envelope. It will be understood that alternative numbers of contour planes could be used. It is a matter of design choice, with regard to the necessary accuracy and tolerance that the user requires in the eventual digital map created of the object 10, which defines the number of contour planes used. It will be understood that more and closer spacing of planes gives a greater degree of accuracy but will require more processing in terms of time and data point manipulation by the processor unit of the point digitiser. Furthermore, where necessary greater accuracy may be achieved for certain areas of the object 10 by closer spacing of planes in those areas.

In FIG. 5 contour points at the seat end of the shoe last object 10 are illustrated as broken lines. Each contour plane is identified by index j. Each contour plane is constructed so as to intersect either pair of the two toplines 13,14 or the two featherlines 15,16. The intersection point with a topline 13, 14 is defined as Ej and with a featherline 15, 16 with Sj respectively. The manner in which the contour planes are defined is illustrated with regard to FIGS. 5 and 6.

The object 10 is divided into halves for simplicity.

The boundary of the two halves is formed by the forepart symmetry line 11 and the seat symmetry line 12. There is no rigid demarcation between the two halves as cloud data points in the neighbourhood of these symmetry lines 11,12 can be used in determining the contour plane either side of the lines 11,12.

Cloud digitisation proceeds by the user performing a stream-feed whilst scrubbing i.e. randomly moving, the pen element of the point digitiser in contact with the object 10, i.e. shoe last. The pen element is scrubbed or randomly drawn over the surface of the object 10 whilst data points are acquired automatically or by pressing some activation device. It will be understood that, the process of cloud data acquisition can be facilitated by presenting a graphical display of the points acquired within the dimensional envelope defined previously on a visual display unit. Thus, the concentration of randomly digitised cloud points for a particular half of the object 10 can be shown. In order to achieve the most accurate results, it is advisable as a general rule to concentrate upon areas of the object 10 which have the most significant curvature, such as with regard to a shoe last the cone, seat and the toe area of the shoe last. Thus, areas of significant curvature in the object 10 are more accurately defined, by the number of data points available for projection, processing and statistical polling.

It will be understood, that the number of data points collected to achieve a reasonably accurate digitisation of the object 10 is dependent upon user requirements. Thus, the more points taken, the more accurate the defined digital map of the object 10 may be but processing time will be significantly increased, both in terms of the random scrubbing time of the pen element of the point digitiser across the surface of the object 10 and, in terms of processing time required by the processor unit necessary to achieve the contour planes defined between points Ej and Sj. As indicated above, the most convenient number of contour planes for a shoe last appears to be 72. In order to determine a contour plane, the processor unit initiates such a plane at a start point Sj on either featherline 15 or 16. A series of most conveniently evenly spaced points Sj are generated about the featherlines 15,16 which lie about the bottom dimensional envelope of the object 10. These points Sj in association with respective topline points Ej define the contour planes.

A processor unit is arranged to define the contour between point Sj on the featherline 15 or 16 to the point Ej on the topline 13 or 14 respectively. A series of points are generated which lie in the plane j and are controlled by a direction vector Ej-Sj. The next point Pj is determined as the closest data point in the cloud data set to the initial start point Sj. For this purpose the topline points Ej are included in the set of cloud data points. The next stage is an iterative process by the processor means whereby a contour for the object 10 is defined from the point Sj to the point Ej by a best-fit process trying each data point of the cloud data set. The repetitive element of this process is the searching for the next point Qj. This point Qj is found by carrying out a search of all the data points in the cloud data set and finding the closest point to the previous data point which exhibits the following attributes:

a) is on the opposite side of the contour plane j defined by the subject initial start point Sj in the featherline 15,16 and the point Ej in the topline 13,14;

b) satisfies the following relationship:

$$(Pj-Sj).(Ej-Sj)<(Qj-Sj).(Ej-Sj).$$

where "." represents the vector scalar product.

Figure 6:
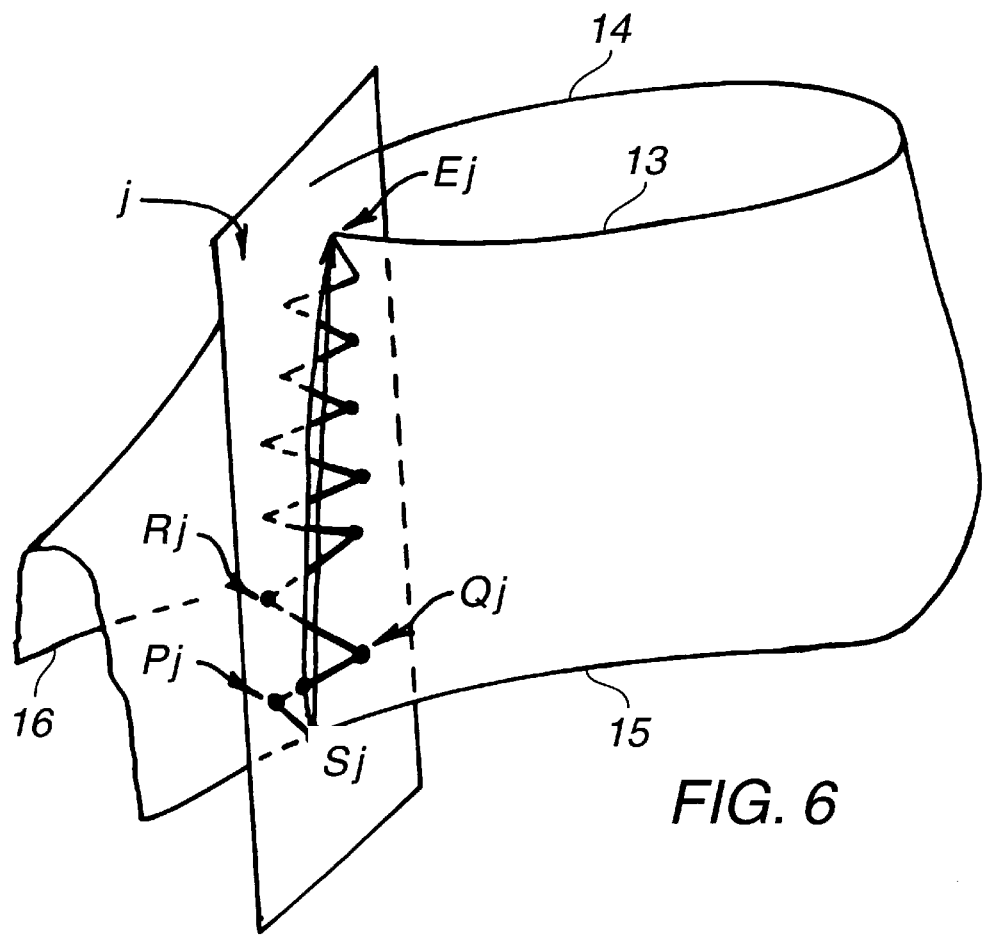
FIG. 6 is a schematic illustration of data points acquired in accordance with the present invention and utilised to form an object contour plane as required to define object shape for a digital map.

The process of iterative definition is shown in FIG. 6. Once the iterative process has been completed for the point Pj to find Qj then it is repeated using Qj as the seed to find the next point Rj using the same attribute equations as defined above. Furthermore, this procedure is repeated until a complete projection is made between points Sj to Ej, i.e. point Ej is found. Once this projection has been completed the iterative process is completed for that respective contour plane j. The next step is to repeat the process for all other contour planes defined for the object envelope.

What is now determined by this projection procedure is in effect a zig-zag or wavy line projected in the contour plane j from the featherline 15 (Sj) or 16 to the topline 13 (Ej) or 14 which alternates in cutting through the contour plane j. The points where this wavy projected line intersects with the contour plane j are determined by vector algebra. Thus, a further set of data points are defined which lie in the contour plane j rather than alternately either side of the plane j. This series of data points start at Sj and ends at the point Ej. Furthermore, as all the points now intersect the contour plane j, a three-dimensional curved spline can be fitted to them. This spline is then sub-divided into twenty-five equal divisions producing twenty-six equally spaced points. These points are defined by an index i. Furthermore, these points can be considered latitude points for the digital map of the object 10.

When all of the contour planes, i.e. seventy-two in the embodiment illustrated, have been processed in this way a regular two-dimensional array of these three-dimensional points is defined by the processor means. Thus, each point in each contour plane about the object 10 is defined by reference to a spacial position defined in terms of X, Y and Z; i.e. X (i,j), Y (i,j) and Z (i,j) where j is greater than or equal to 1 but less than or equal to 72 and i is greater than or equal to 1 but less than or equal to 26.

It will be appreciated that in effect a net is defined for the object 10 which comprises seventy-two downward, longitudinal, lines between the featherlines 15,16 and toplines 13,14 and twenty-six horizontal, latitudinal, lines emanating from the forepart symmetrical line 11 and seat symmetrical line 12 consistently around the object 10. This regular mesh or net is amenable to standard surface fitting techniques such as B splines to produce a complete surface definition of the object 10. Thus, the mesh or net defined by the points X (i,j), Y (i,j) and Z (i,j) defines a digital map of the object 10. This digital map can be used by a CAD system to represent the object upon which design components will be assembled.

The technique described above essentially relates to digitisation of the whole object 10 at once. However, it will be understood that access to the object 10 may be limited both by the flexibility of the digitiser pen arm mounting etc or the mounting post for the object 10.

It is important that the spacial position and orientation of the object 10 relative to the digitiser pen is known in order that cloud data can be collected. If the object 10 is mounted upon a post penetrating the sole of the object 10 access to this sole region of the object may be limited.

In view of the above, in the present invention it is envisaged that three points upon the object 10 may be designated reference points, for example any three of P1, P2, P3 or P4. Thus, with these reference points registered, a first part of the object 10 i.e. one half may be digitized. The object 10 may then be re-oriented e.g. rotated and the reference points re-acquired to ensure the data acquired with regards to a second part of the object 10 is keyed into correct position relative to the first part data set. Similar key location may be conducted for other parts of the object 10 however, it is preferred that the object 10 is digitised in two parts or halves with a roughly 180° rotation of the object 10 between the respective data acquisition procedures.

Typically, the object reference points are marked such as by creating an indentation or applying an ink spot. Thus, there will be consistent acquisition of these reference points by the digitiser pen member with consequent good keying between the cloud data capture sets for each respective part of the object 10.

Using the above multi-part approach to object 10 digitization the following steps will be taken:

a) Fix the object 10 in a mounting such that a first part i.e. half is conveniently exposed;

b) Registration of the object 10 position in the mounting by 3 points such as a fore toe point, a back heel point and a top cone point. Ensure these points are indelibly marked.

c) Line digitise the forepart symmetry line, the seat symmetry line, the top line and the feather line for that part of the object;

d) Perform a necessary cloud data capture operation on the part in sufficient detail to allow accurate digitization and so map of the object 10.

e) Re-orientate the object 10 to expose another part of the object i.e. the other half and fix it in that orientation.

f) Re-register using the digitiser pen the object 10 using the 3 reference points marked on the object 10 (i.e. step b) above).

g) Line digitize those lines of the object 10 not already acquired through steps above i.e. only the feather line and top line as the forepart symmetry line and the seat symmetry line are already known from step c) above.

h) Perform a necessary cloud data capture operation on this part of the object 10.

i) Repeat the above steps until all parts of the object 10 have been digitized.

j) Once all the parts of the object 10 have been digitized by cloud data capture, all this data is analysed as indicated above with regard to contour projection using a best-fit process between point Sj and Ej to create the desired digital map of the object 10.

This digital map is used to provide a surface upon which design features can be applied. For example, in shoe design layers of upper material may be applied in various component shapes and with various decorative/constructional stitch patterns. Furthermore, different surface textures, colours and ornamentation could be tried.

We claim:

1. A method of digitising a three-dimensional object using a point digitiser, the method including the steps of:

a) presenting the object to the point digitiser such that at least a first part of its respective envelope dimensions in the X, Y, Z-axes planes are determined;

b) scrubbing the point digitiser across the surface of the object such that random spacial data points are collected as a cloud data set;

c) at spaced positions about the envelope dimensions determining best fit line projections from the spacial data points in the cloud data to create for each spaced position an object contour which defines the shape of that object in the projected plane of each respective spaced position; and d) consolidating each part digitized through steps (a), (b) and (c) above and, in particular, the object which represents the three-dimensional shape of that object.

2. A method as claimed in claim 1 wherein a first part of the object is registered by defining three reference points about the object and marking said reference points upon the object to ensure good keying when the object is moved to digitise other parts of the object.

3. A method as claimed in claim 2 wherein the reference points are indelibly marked with ink or indentation in the object surface.

4. A method as claimed in claim 1 wherein the object is digitised in two halves.

5. A method as claimed in claim 1 wherein 72 object contours are defined.

6. A method as claimed in claim 1 wherein the projected planes are defined at equally spaced positions about the envelope dimensions.

7. A method as claimed in claim 1 wherein the projected planes are defined at variably spaced positions about the envelope dimensions in order to provide better definition of the object at parts of the object where the projected planes are more closely spaced.

8. A method as claimed in claim 1 wherein the data points are collected and determined in order to filter said points for duplication of such data points are a result of back tracking or substantially multiple determination of the same data point.

9. The method according to claim 1 wherein the three-dimensional object is a shoe last.

* * * * *